US008020652B2

(12) United States Patent
Bryan et al.

(10) Patent No.: US 8,020,652 B2
(45) Date of Patent: Sep. 20, 2011

(54) GENERATOR POWER-BASED COLD START STRATEGY

(75) Inventors: Paul Stephen Bryan, Belleville, MI (US); Christopher Adam Ochocinski, Canton, MI (US); Kenneth Frederick, Dearborn, MI (US); Shunsuke Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 807 days.

(21) Appl. No.: 11/949,956

(22) Filed: Dec. 4, 2007

(65) Prior Publication Data
US 2009/0140521 A1 Jun. 4, 2009

(51) Int. Cl.
*B60W 10/08* (2006.01)
(52) U.S. Cl. ............... 180/65.285; 701/113; 903/906
(58) Field of Classification Search ............ 180/65.265, 180/65.275, 65.28, 65.285, 65.31; 903/906, 903/930; 701/22, 113
See application file for complete search history.

(56) References Cited

U.S. PATENT DOCUMENTS

| 5,865,263 | A   | * | 2/1999  | Yamaguchi et al. ...... 180/65.235 |
| 6,291,902 | B1  | * | 9/2001  | Ogane et al. ............ 290/34 |
| 6,459,166 | B2  |   | 10/2002 | Yanase et al. |
| 6,581,705 | B2  |   | 6/2003  | Phillips et al. |
| 6,732,526 | B2  |   | 5/2004  | Minagawa et al. |
| 7,013,213 | B2  | * | 3/2006  | McGee et al. ............ 701/113 |
| 7,121,257 | B2  | * | 10/2006 | Dolker ................ 123/352 |
| 7,121,975 | B2  | * | 10/2006 | Tomura et al. ............ 477/2 |
| 7,143,851 | B2  | * | 12/2006 | Masterson ............ 180/65.25 |
| 7,275,610 | B2  | * | 10/2007 | Kuang et al. ............ 180/65.265 |
| 7,285,869 | B2  | * | 10/2007 | Syed et al. ............ 290/40 C |
| 7,610,892 | B2  | * | 11/2009 | Butcher et al. ............ 123/179.3 |
| 2005/0145217 | A1 |   | 7/2005  | Takama et al. |
| 2006/0016412 | A1 |   | 1/2006  | Butcher et al. |
| 2006/0030979 | A1 |   | 2/2006  | Kuang et al. |
| 2007/0056784 | A1 |   | 3/2007  | Joe et al. |

FOREIGN PATENT DOCUMENTS

| EP | 0729858 A1 | 4/1996 |
| EP | 1439296 A2 | 7/2004 |
| EP | 1526023 A2 | 4/2005 |

OTHER PUBLICATIONS

Search Report for EP 08170084, dated Jan. 28, 2010.

* cited by examiner

*Primary Examiner* — John Walters
(74) *Attorney, Agent, or Firm* — David B. Kelley; Brooks Kushman P.C.

(57) ABSTRACT

The method of the invention controls engine speed during engine starting for a hybrid electric vehicle that includes a battery, an engine and a generator, acting as a motor, whereby generator torque assists the engine to develop a stable running speed throughout an engine start event, particularly a cold engine start event, without violating battery power limits.

12 Claims, 4 Drawing Sheets

GENERATOR POWER-BASED COLD START STRATEGY

BACKGROUND OF THE INVENTION

1. Field of the Invention

The invention relates to a control strategy for starting an engine in a hybrid electric vehicle powertrain having parallel power delivery path to vehicle traction wheels.

2. Background Art

In a hybrid electric vehicle powertrain of the type disclosed, for example, in U.S. Pat. No. 7,013,213 and in U.S. Patent Application Publication No. U.S. 2006/0016412 A1, an internal combustion engine and electric traction motor are used to develop vehicle traction wheel torque in a split power delivery path. The power delivery path is defined in part by a torque splitter planetary gear system in which a planetary carrier is drivably connected to an engine crankshaft and a ring gear is driveably connected through gearing to a differential-and-axle assembly for the vehicle traction wheels. An electric motor also is coupled to the differential-and-axle assembly through the gearing. The motor and an electric generator are electrically coupled, together with a battery, in a generator-motor-battery sub assembly. The generator is directly connected to a sun gear, which serves as a reaction member, as engine power is delivered to the gearing through the planetary gear unit.

Engine power output is divided into two parallel paths by controlling generator torque. A mechanical power flow path is established from the engine to the planetary gear unit and ultimately to a power output shaft. The other power flow path is an electrical power flow path that distributes power from the engine, to the generator, to the motor, and then to the power output shaft. The generator, the motor and the planetary gear unit thus may operate as an electricro-mechanical transmission with continuously variable ratio characteristics.

A vehicle system controller coordinates the divided power distribution. Under normal operating conditions, the vehicle system controller interprets a driver's demand for power as a function of acceleration or deceleration demand. It then determines when and how much torque each power source needs to provide in order to meet the driver's power demand and to achieve a specific vehicle performance while taking into consideration engine fuel economy, emission quality, etc. The vehicle system controller will determine the operating point of the engine torque and speed relationship.

The generator, when it is acting as a motor, can deliver power to the planetary gearing. That power can be used to provide engine cranking during an engine start. When the generator is acting as a generator, it is driven by the planetary gearing to achieved charging power for the battery. The generator can act as a generator when it is driven by the portion of the engine power that is not delivered mechanically through the transaxle gearing. The balance of the engine power delivered through the planetary gearing to the generator charges the battery and the battery drives the traction motor in a positive power split configuration. In this fashion, the two power sources, i.e., the engine and the generator-motor-battery subsystem, are integrated so that they work together seamlessly to meet a driver's demand for power. The system will achieve an optimum power split between the two power sources.

The generator acts as a starter motor for the internal combustion engine. The engine, during a normal operating cycle, must be started and stopped frequently. Each time it is started, it must be started quickly, quietly and smoothly over a large range of temperatures without violating battery power limits.

The engine starting mode must not occur for an extended period of time in a so-called resonance zone during which engine torque delivery is unstable and characterized by torque spikes. A typical engine speed range for this so-called resonance zone would be approximately 300-500 rpm for a typical contemporary automotive vehicle engine.

Fulfillment of these various engine start requirements is difficult to achieve when the engine temperatures are very cold. A cold engine requires more energy for cranking because of increased friction of cold engine lubricants. Further, a cold battery cannot supply as much energy due to limitations of the chemistry of the battery. If the engine is designed with variable valve timing, the starting of a cold engine becomes even more difficult. That is because the addition of the variable intake valve timing feature for reduced noise vibration and harshness (NVH) of the engine reduces the pressures inside the engine cylinders. This in turn requires a higher cranking speed before the engine can start.

A cold start strategy is discussed in U.S. Patent Application Publication No. US 2006/0016412 A1. That cold start strategy requires a commanded target engine speed that is constant during a starting event. Variations in the torque required to crank the engine using the strategy of the '412 publication causes fluctuations in the power used to crank the engine. Thus, the transmission and engine friction in cold environments can cause over discharge of the high voltage battery. Further, a single strong transient combustion event in at least one of the engine cylinders can momentarily increase engine speed. The generator then is prompted by an increased engine speed signal to respond to the transient combustion event by reducing generator torque command. This can cause the generator to stop assisting the engine during the cranking mode, which can lead to engine stalls or a "no-start" situation because of an inherent control signal response time delay in the engine controller and because of a physical lag time caused by transient kinetic energy changes for the rotary mass of the crankshaft and components mechanically connected to the crankshaft.

If the engine successfully and consistently develops engine driving torque using a strategy of the kind described in the '412 patent application publication, engine speed is pulled through the resonance zone of approximately 300-500 rpm before the engine speed is increased to the desired engine idle speed. This can result in using more battery power than the battery can safely provide. This can result in low battery voltage situations as the battery's state of charge is depleted. This may cause a reduced battery life.

SUMMARY OF AN EMBODIMENT OF THE INVENTION

An objective of the invention is to avoid limitations of known control systems of the kind previously described and to improve engine cold start performance. This is achieved by the strategy of the present invention by controlling generator power rather than engine speed during engine cranking of a cold engine. If the engine friction is high due to cold engine temperature, the engine speed during cranking will be lower than it would be when the engine temperature is high. Further, the generator will continue to provide torque to assist engine cranking even if the engine provides torque intermittently during the starting cycle. The strategy of the invention includes a selection of a target generator power that is below the high voltage battery power limit. In this way, the controller strategy will prevent gross power limit violations while reducing the duration of the engine starting cycle.

The strategy of the invention includes a step of calculating a desired engine cranking speed using a closed-loop control technique, which targets a specific generator power to use during an engine start while taking into consideration the battery power limits when a stable engine torque is created. The generator power used to maintain the engine speed will result in an increase in the cranking speed to assist the engine through an unstable combustion period. During the engine starting cycle the strategy therefore will avoid the need for the transaxle to apply extra torque to assist the engine in passing through a so-called "resonance zone" following initial combustion in the engine cylinders. The engine and the transmission thus work together at a targeted generator power.

A given generator power controller strategy will be able to consistently raise engine speed for a family of engines with the same temperature/friction characteristics. This will simplify the calibration of an engine to achieve an engine start fueling event with best exhaust gas emission quality.

DETAILED DESCRIPTION OF AN EMBODIMENT OF THE INVENTION

Figure 1:
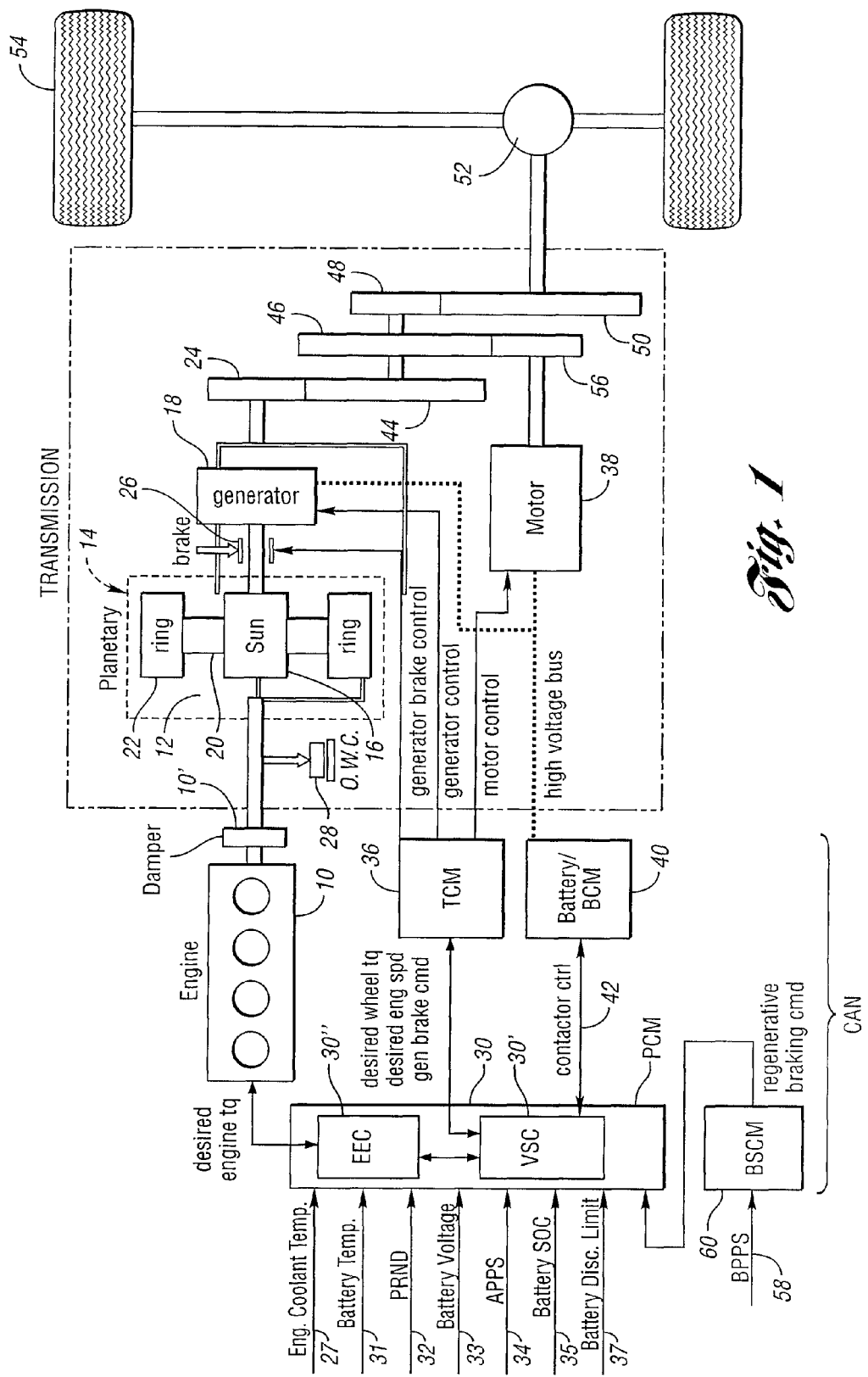
FIG. 1 is a schematic overview of a powertrain capable of using the strategy of the present invention.

In the hybrid powertrain configuration schematically illustrated in FIG. 1, a torque output crankshaft of internal combustion engine 10 is connected drivably through crankshaft damper 10' to carrier 12 of planetary gear unit 14. Sun gear 16 of the gear unit 14 acts as a reaction element and is drivably connected to generator 18. Carrier 12 rotatably supports planet pinions 20, which engage sun gear 16 and ring gear 22, the latter being connected drivably to transmission torque input gear 24. The generator 18 provides reaction torque when the engine delivers driving power to the transmission. The generator, which is part of a motor-generator-battery electrical subsystem, develops electrical power to complement mechanical engine power. A reaction brake 26 can be applied to establish a reaction point for the sun gear 16 and to deactivate the generator 18.

When the generator acts as a motor and the engine is de-activated, the crankshaft for the engine is braked by an overrunning coupling 28. Overrunning coupling 28 could be eliminated if sufficient reaction torque can be accommodated by the engine crankshaft when the engine is shut off.

The main controller for the powertrain is a powertrain control module, generally shown at 30 in FIG. 1. It receives a driver-selected signal at 32 indicating whether the transmission is conditioned for park, reverse, neutral or drive mode. A battery temperature signal is distributed to control module 30 as shown at 31. An accelerator pedal position sensor delivers a signal at 34 to the powertrain control module 30. This is an indicator of driver power demand. The module 30 also receives an engine coolant temperature signal 27, a battery voltage signal 33, a battery state of charge signal 35, and a battery discharge limit signal 37.

Engine 10 is under the control of an electronic engine controller 30" which is part of the powertrain control module 30.

The desired wheel torque command, the desired engine speed command and the generator brake command are developed by a vehicle system controller 30' and distributed to the transmission control module 36 for controlling the transmission generator brake, the generator control and the motor control. Electric power is distributed to an electric motor 38, which may be a high torque induction motor, although other electric motors could be used in carrying out the control functions of the invention.

The electrical power subsystem, of which the generator 18 and the motor 38 are a part, includes also battery and battery control module 40, which is under the control of the vehicle system controller 30', the latter developing a command at 42 for a battery control module contactor, which conditions the battery for charging or for power delivery. The battery and battery control module, the motor and the generator are electrically connected by a high voltage bus as indicated by dotted lines.

The transmission includes countershaft gearing having gear elements 44, 46 and 48. Gear element 48 is connected to torque output gear 50, which delivers power to differential 52 and to traction wheels 54. The motor armature is connected to motor drive gear 56, which drivably engages gear element 46.

Application of the vehicle brakes develops a brake pedal position sensor signal 58, which is delivered to the brake system control module 60 for initiating a regenerative braking command by the vehicle system controller.

A hybrid vehicle powertrain, such as that illustrated in FIG. 1, makes use of a combination of the engine and generator using the planetary gear unit 14 to connect them to each other. In one driving mode, the electric drive system, including the motor, the generator and the battery, can be used independently of the engine. The battery then acts as an energy source. When the engine is operative, the vehicle is propelled in a forward direction as reaction torque for the planetary gear unit is accommodated by the generator or by the reaction brake 26.

The planetary gear unit 14 effectively decouples the engine speed from the vehicle speed using a generator command from module 36. Engine power output then is divided into two power flow paths, one being a mechanical path from the carrier 12 to the ring gear 22 and finally to the transmission input gear 24. Simultaneously, an electrical power flow path is established from the carrier 12 to the sun gear 16 to the generator, which is coupled electrically to the motor. Motor torque drives output gear 56. This speed decoupling and the combined electrical and mechanical power flow paths make this transmission function with characteristics similar to a conventional continuously variable transmission.

When the electrical power flow path is effective with the engine inactive, the electric motor draws power from the battery and provides propulsion independently of the engine in both forward and reverse directions. Further, the electric motor can provide braking torque as the motor acts as a generator. This captures the vehicle kinetic energy during braking, which otherwise would be lost to heat, thereby charging the battery. Both the engine and the motor-generator-battery subsystem, as mentioned previously, can be used simultaneously to propel the vehicle in a forward direction to meet the driver's power demand and to achieve better acceleration performance.

As in the case of conventional continuously variable transmission vehicles, fuel economy and emission quality are improved by operating the engine at or near its most efficient region whenever possible as previously explained. Fuel economy, as well as emissions quality, potentially can be improved still further because the engine size can be reduced while maintaining the same vehicle performance since there are two power sources. The engine can be stopped (turned off) and the motor can be used as the sole power source if the required engine operating conditions for the engine are not favorable for fuel economy and emissions quality purposes.

In the case of the configuration shown in FIG. 1, the two power sources work together seamlessly to achieve the goal of achieving better fuel economy and emission quality. The vehicle system controller coordinates the vehicle control between the two power sources. The vehicle system controller carries out hierarchical functions as it coordinates vehicle control under various powertrain operating conditions. Assuming there are no subsystem component malfunctions, the vehicle system controller interprets driver demands, such as the drive range selection at 32 and acceleration or deceleration demand at 34, and then determines a wheel torque command based on the driver demand and the powertrain limits. In addition, the vehicle system controller determines how much torque each power source needs to provide, and when it needs it, in order to meet driver demand and to achieve a specified vehicle performance, a desired fuel economy and a desired emission quality level. The vehicle system controller thus determines when the engine needs to be turned off and on. It also determines the engine operating point (i.e., the engine speed and torque) for a given engine power demand when the engine is on.

If the vehicle is stopped at a traffic light, for example, the engine will be stopped. The engine must be started and stopped several times during normal city driving. Since the engine starting and stopping events can occur unexpectedly to the driver, unlike initial start-up of the vehicle using the ignition key switch, a start-up event for the engine during normal city driving should be imperceptible.

Figure 2:
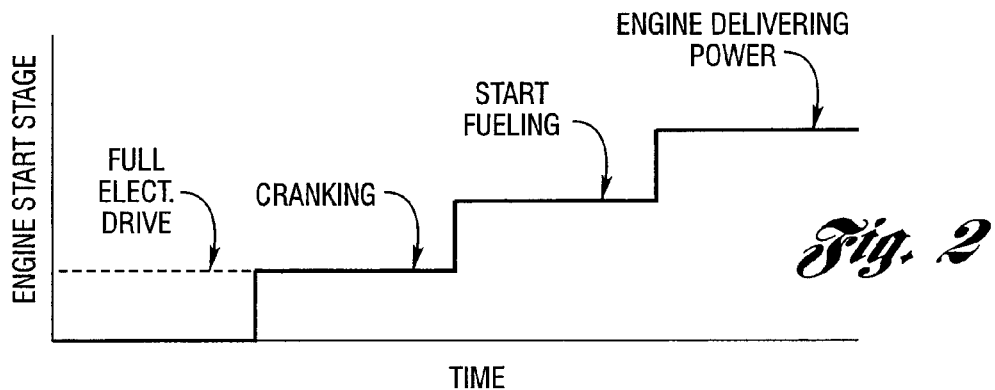
FIG. 2 is a diagram showing engine start speed stages.

As shown in FIG. 2, the engine start-up event can include several stages, which are identified in FIG. 2 as the cranking or engine speed command profiling stage, the start fueling stage and the engine delivery power stage. Transitions from one stage to the other can occur at various times, depending on the driving conditions and other operating variables. Thus, the cranking stage, for example, can be shifted to the left or the right on the time plot of FIG. 2. The same is true for the start fueling stage and the engine power delivering stage.

Figure 3:
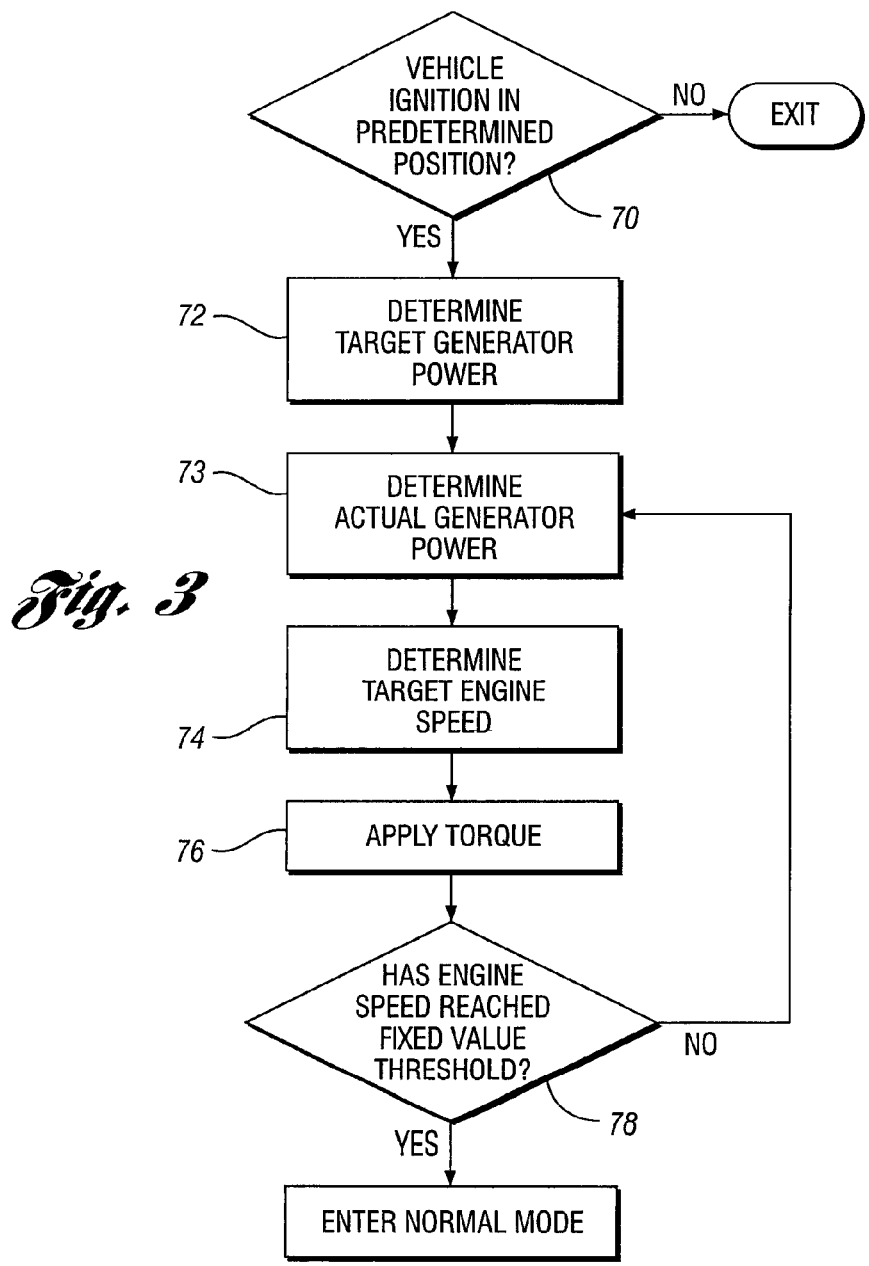
FIG. 3 is a flow chart of the control strategy of the present invention.

FIG. 3 shows the control strategy of the present invention whereby the generator power is controlled during engine cranking, unlike a known strategy of controlling engine speed using generator torque reaction. The strategy of FIG. 3 demonstrates also that the generator will continue to provide power assistance to the engine during the entire engine cranking event even when engine operation is unstable. The target generator power that is selected will be below the high voltage battery power limit.

In FIG. 3 it is determined at decision block 70 whether the engine ignition system is in a starting mode. If that is the case, a target generator power is determined at action block 72. This will be described subsequently with reference to FIG. 4.

After the target generator power is determined, the actual generator power is determined at action block 73 and a target engine speed is determined at action block 74. Using the actual generator power and the engine speed, a torque value is determined at action block 76. At decision block 78, it is determined in a closed-loop fashion whether the engine speed has reached a fixed value threshold. If the answer determined at 78 is positive, the engine will have entered its normal operating mode, and the engine starting event is complete.

Figure 4:
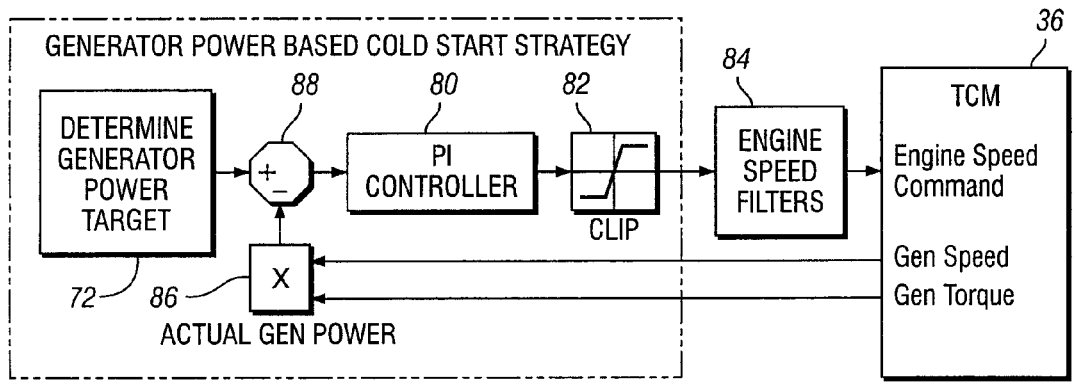
FIG. 4 is a control block diagram showing a closed-loop control for determining a generator power target during an engine cold start event.

FIG. 4 is a schematic diagram of the generator power-based cold start strategy in the portion of the flowchart identified by reference numerals 73-78. The strategy calculates a desired engine cranking speed using a closed-loop controller to target a specific generator power to use during the engine start event. The vehicle system controller 30', seen in FIG. 1, calculates the desired generator power target at action block 72 in FIG. 4 taking into account the battery's power limit and actual engine temperature. A proportional-integral (PI) control system determines a target engine speed at 74 in FIG. 3 using a PI controller seen in FIG. 4 at 80. The engine speed determined at 80 is clipped at 82 to avoid exceeding precalibrated speed limits. The clipped value then passes through engine speed filters at 84 to eliminate extraneous transient engine speed fluctuations. The filtered engine speed is received by the transmission control module 36. The generator torque signal transmitted by the vehicle system controller 30', together with the filtered engine speed, is multiplied to determine an actual generator power as shown at 86 in FIG. 4. That actual generator power then is summed with the generator power target at 88 to produce an error signal that is distributed to the PI controller 80, thus completing the closed-loop control.

Figure 4A:
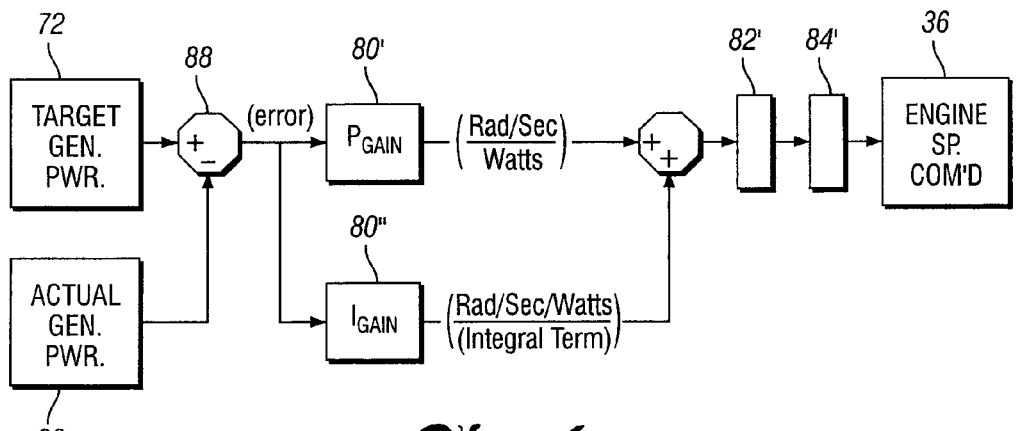
FIG. 4a is a block diagram of the control steps carried out by the PI controller of the block diagram of FIG. 4.

The proportional and integral gain values shown at 80' and 80" in FIG. 4a are elements of the PI controller 80 in FIG. 3. The engine speed filters 84 in FIG. 4 are shown in FIG. 4a as filter element 84'. The clipping step 82 seen in FIG. 4 is shown at 82' in FIG. 4a.

The transmission control module 36 receives the desired engine speed command from the vehicle system controller over the control area network indicated as "CAN" in FIG. 1. The transmission control module calculates and applies an appropriate generator torque command, as well as the actual generator feedback, to the vehicle system controller 30' using the control area network. The vehicle system controller then calculates the actual generator power used, and then calculates the error feedback term at 86. The PI controller 80 will actively change the target engine speed in order to achieve the target generator power usage. When the minimum engine speed criteria are met, the generator power-based cold start strategy is exited.

The strategy indicated in FIG. 3 will cause the engine cranking speed to increase until the generator power meets the target value. When an engine combustion event occurs and pulses of torque are created, the generator power used to maintain the engine speed will drop resulting in an increase of cranking speed to maintain the engine power target. This in effect assists the engine through the unstable combustion period during engine startup.

The engine cranking speed is determined by controlling the generator to provide a specific generator power. This targeted generator power is directly related to the amount of battery power used when starting the engine. In addition, because the engine is assisted throughout the entire engine starting cycle, the transmission will not be required to apply extra torque to artificially pull the engine through the unstable resonance zone, which may be about 300-500 rpm.

The strategy of the invention will provide a generator power to increase engine speed consistently for a variety of engines with the same temperature/friction characteristics, thus making calibration of the engine simpler to achieve the correct fueling during an engine start to improve exhaust gas emissions. This is in contrast to the starting cycle used in known hybrid vehicle powertrains when the engine start characteristics change drastically due to widely varying temperatures. A low battery temperature at any given engine temperature would result in a low cranking speed, and a warmer battery temperature at the same engine temperature would result in a higher cranking speed.

The strategy of the invention will provide faster and smoother engine starting by continuously assisting the engine during an engine start event. It will ensure that the limits imposed by the battery are not violated.

Figure 5:
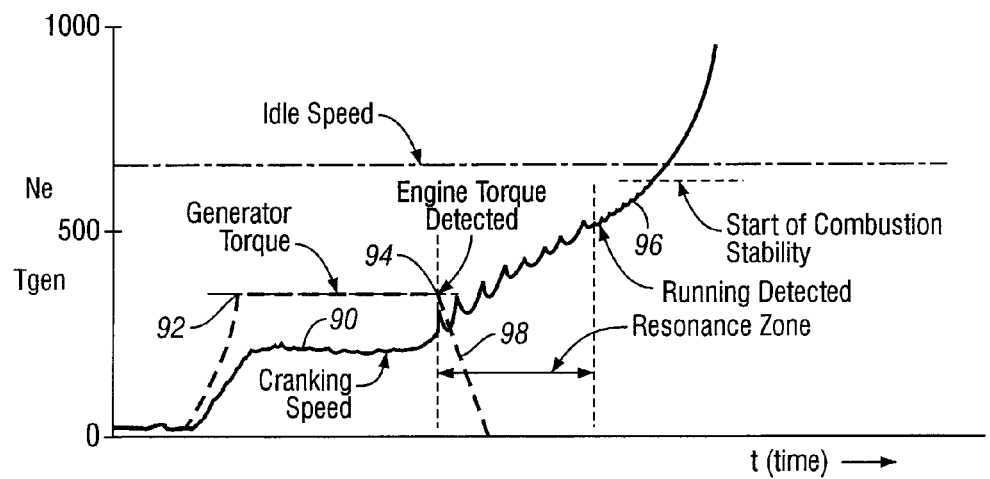
FIG. 5 is a time plot of engine speed changes for a conventional engine cold start event.

FIG. 5 shows a time plot of engine speed during an engine start event using a known strategy. The engine cranking speed is plotted in FIG. 5 at 90. A generator torque required to obtain an engine cranking speed at 90 is indicated at 92. The generator torque is maintained at a value sufficiently high to allow a generally uniform cranking speed until the engine begins to fire. Typically, this occurs in a zone with increased resonance compared to the instability that typically occurs during the engine cranking phase at 90. This resonance zone occurs because of instability in the engine combustion. At an engine speed of approximately 500 rpm, engine running is detected, but the engine combustion becomes unstable. At a time indicated at 94, engine torque is detected, which results in an increase in engine speed until combustion stability is achieved at 96. As soon as an engine torque is detected at time 94, generator torque decreases rapidly as shown at 98. That is because a vehicle system controller in a known strategy is a generator speed based control, which attempts to maintain the engine at a constant speed. The generator torque thus will fall rapidly as soon as engine torque is detected at a time later than time shown at 92, even though the combustion stability at that time may be unstable and the engine speed increase is merely transient.

Figure 6:
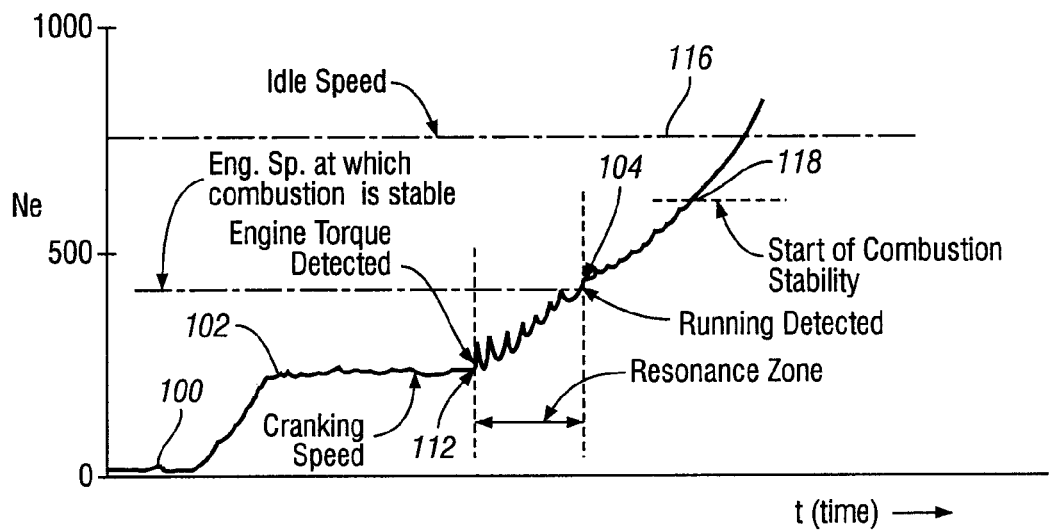
FIG. 6 is a time plot of engine speed changes for an engine cold start using the strategy of the present invention.
Figure 7:
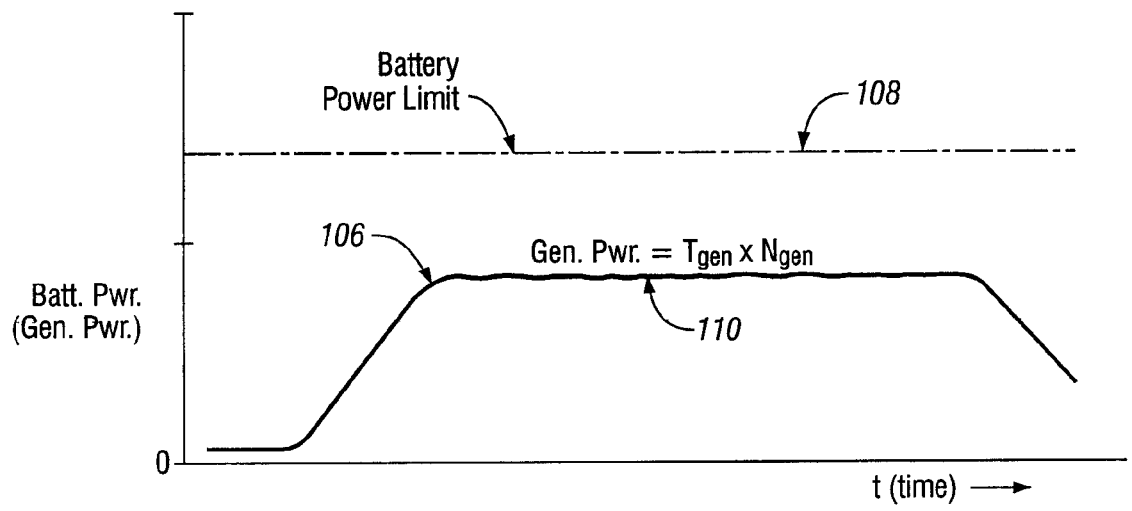
FIG. 7 is a time plot of battery power during an engine cold start event using the strategy of the present invention.

In contrast to the known engine start strategy demonstrated in FIG. 5, the corresponding strategy of the present invention is illustrated at FIGS. 6 and 7. FIG. 6 is a time plot of engine speed between the beginning of the engine start event at 100 to the completion of the start event. When engine cranking is initiated, an engine cranking speed shown at 102 is developed. This corresponds to the cranking speed as shown at 90 in FIG. 5. The cranking speed may have fluctuations in a narrow speed window. The battery power necessary to develop the engine cranking speed shown at 102 in FIG. 6 is indicated in FIG. 7 at 106. When engine torque is detected at 112, a resonance zone occurs as engine speed increases to the speed at 104.

The battery power limit, which is plotted in FIG. 7 at 108, is higher than the generator power indicated at 106. Unlike the plot shown in FIG. 5, the generator torque at the cranking speed remains relatively constant as shown at 110 throughout the entire cranking event. The battery power thus is unchanged as the engine cranking speed increases from time 112 to time 104 in FIG. 6. It is this time interval in which relatively unstable engine combustion occurs. The time period during which the unstable combustion occurs, however, is shorter than the corresponding time interval indicated in FIG. 5 and the magnitude of torque fluctuation is reduced. This is because the battery is used to assist engine power, and the engine is not required to act alone in generating an increase in engine speed up to the desired idle speed at 116. The idle speed indicated in FIG. 6 at 116 is typically higher than the engine speed at 118 corresponding to the point at which engine combustion stability occurs.

Although an embodiment of the invention has been disclosed, it will be apparent to persons skilled in the art that modifications may be made without departing from the scope of the invention. All such modifications and equivalents thereof are intended to be covered by the following claims.

What is claimed:

1. A method for controlling a start event of an engine in a hybrid electric vehicle powertrain comprising an internal combustion engine forming a first power source, an electric generator, a battery and an electric motor forming a second power source, gearing defining power flow paths from the first and second power sources to vehicle traction wheels, the generator and the engine being mechanically connected to separate elements of the gearing whereby the generator, acting as a motor, delivers engine cranking power to the engine when engine torque is detected during an engine start event, the method comprising the steps of:

controlling a target generator power in a closed-loop fashion using actual generator power as a feedback variable throughout an engine start event whereby generator torque assists engine torque at engine speeds less than a stable engine idle speed when engine combustion is unstable.

2. The method set forth in claim 1 wherein the step of controlling a target generator power further comprises limiting generator power to a value that does not exceed a calibrated maximum battery power limit during an engine start event.

3. The method set forth in claim 1 wherein the step of controlling a target generator power comprises the step of determining actual generator power and using actual generator power as a closed-loop feedback variable to adjust generator power whereby generator power assists engine power during periods of engine combustion instability at engine speeds lower than a stable engine idle speed.

4. The method set forth in claim 3 wherein the step of controlling a target generator power further comprises limiting generator power to a value that does not exceed a calibrated maximum battery power limit during an engine start event.

5. The method set forth in claim 3 wherein the step of determining actual generator power comprises measuring a difference between an actual value of generator power and a target generator power in successive closed-loop cycles; and
converting an error between the actual generator power and the target generator power to an engine speed command whereby the engine speed is adjusted toward a stable idle speed during periods of engine combustion instability before stable combustion is achieved.

6. The method set forth in claim 5 wherein the step of controlling a target generator power comprises adjusting the target generator power during an engine start event until stable engine combustion begins.

7. The method set forth in claim 6 where the engine speed at which stable engine combustion begins is at a calibrated fixed threshold.

8. A method for controlling a start event of an engine in a hybrid electric vehicle powertrain comprising an internal combustion engine forming a first power source, an electric generator, a battery and an electric motor forming a second power source, the generator, acting as a motor, delivers engine cranking power to the engine when engine torque is detected in a vibration resonance zone during an engine start event, the method comprising the step of:

controlling a target generator power in a closed-loop fashion using actual generator power as a feedback variable throughout an engine start event as generator torque assists engine torque at engine speeds less than a stable engine idle speed when engine combustion is unstable, whereby the duration of the vibration resonance zone is minimized and engine speed is increased until generator power meets the generator power target.

9. The method set forth in claim 8 wherein the step of controlling a target generator power comprises limiting generator power to a value that does not exceed a calibrated maximum battery power limit during an engine start event.

10. The method set forth in claim 8 wherein the step of controlling a target generator power includes the step of determining actual generator power and using actual generator power as a closed-loop feedback variable to adjust generator power whereby generator power assists engine power during periods of engine combustion instability at engine speeds lower than a stable engine idle speed.

11. The method set forth in claim 10 wherein the step of determining actual generator power comprises measuring a difference between an actual value of generator power and a target generator power in successive closed-loop cycles; and converting an error between the actual generator power and the target generator power to an engine speed command whereby the engine speed is adjusted toward a stable idle speed during periods of engine combustion instability before stable combustion is achieved.

12. The method set forth in claim 10 wherein the step of controlling a target generator power further comprises limiting generator power to a value that does not exceed a calibrated maximum battery power limit during an engine start event.

* * * * *